(12) United States Patent
Guo et al.

(10) Patent No.: US 11,336,852 B2
(45) Date of Patent: May 17, 2022

(54) PIXEL COLLECTION CIRCUIT AND IMAGE SENSOR

(71) Applicant: OmniVision Sensor Solution (Shanghai) Co., Ltd, Shanghai (CN)

(72) Inventors: Menghan Guo, Shanghai (CN); Shoushun Chen, Shanghai (CN)

(73) Assignee: OMNIVISION SENSOR SOLUTION (SHANGHAI) CO., LTD, Shanghai (CN)

( * ) Notice: Subject to any disclaimer, the term of this patent is extended or adjusted under 35 U.S.C. 154(b) by 0 days.

(21) Appl. No.: 17/378,848

(22) Filed: Jul. 19, 2021

(65) Prior Publication Data

US 2021/0344865 A1 Nov. 4, 2021

Related U.S. Application Data

(63) Continuation of application No. PCT/CN2019/078907, filed on Mar. 20, 2019.

(30) Foreign Application Priority Data

Jan. 29, 2019 (CN) .......................... 201910087026.7

(51) Int. Cl.
| | | |
|---|---|---|
| *H04N 5/374* | (2011.01) | |
| *H04N 5/357* | (2011.01) | |
| *H04N 5/378* | (2011.01) | |

(52) U.S. Cl.
CPC ........... *H04N 5/3741* (2013.01); *H04N 5/357* (2013.01); *H04N 5/378* (2013.01)

(58) Field of Classification Search
CPC ...... H04N 5/3741; H04N 5/357; H04N 5/378; H04N 5/232; H04N 5/23218; H04N 5/37455; H04N 5/341
See application file for complete search history.

(56) References Cited

U.S. PATENT DOCUMENTS

| 11,122,232 | B2* | 9/2021 | Chen | .................. | H04N 5/37452 |
|---|---|---|---|---|---|
| 2018/0191972 | A1* | 7/2018 | Berner | ................. | H04N 5/3741 |
| 2018/0268553 | A1* | 9/2018 | Chen | ...................... | H04N 5/353 |

FOREIGN PATENT DOCUMENTS

| CN | 106162000 A | 11/2016 |
|---|---|---|
| CN | 108632546 A | 10/2018 |
| CN | 109040711 A | 12/2018 |

* cited by examiner

*Primary Examiner* — Nhan T Tran
(74) *Attorney, Agent, or Firm* — IPro, PLLC (57) ABSTRACT

The present disclosure provides a pixel collection circuit and an image sensor. The pixel collection circuit includes: a photoelectric detection module configured to monitor an optical signal in real time and output a corresponding electric signal; a triggering generation module configured to generate a triggering generation signal when a change frequency of the electric signal exceeds a predetermined frequency threshold and an amplitude of the electric signal meets a predetermined condition, and output the triggering generation signal to the interface logic module; and the interface logic module configured to output a triggering state signal upon the receipt of the triggering generation signal.

18 Claims, 6 Drawing Sheets

PIXEL COLLECTION CIRCUIT AND IMAGE SENSOR

CROSS-REFERENCE TO RELATED APPLICATION

This application claims a priority of the Chinese patent application No. 201910087026.7 filed on Jan. 29, 2019, which is incorporated herein by reference in its entirety.

TECHNICAL FIELD

The present disclosure relates to the field of image collection, in particular to a pixel collection circuit, and an image sensor including the pixel collection circuit and used for motion detection.

BACKGROUND

Image sensor is applied in various application fields, e.g., the detection of a moving object, especially in a machine vision image processing system. In this application field, as compared with a conventional image sensor (e.g., an active pixel sensor), a dynamic vision image sensor (dynamic vision sensor for short) has attracted more and more attention due to its unique advantages. Through a pixel unit designed in accordance with a bionics principle (i.e., a pixel collection circuit), the dynamic vision sensor may continuously respond to a change in a light intensity in a field of view in real time without any exposure time. In addition, the dynamic vision sensor merely responds to, and outputs, position information about the pixel unit corresponding to a region where the change in the light intensity in the field of view occurs, and automatically filters out useless background information, so it has such advantages as small data volume, small occupied bandwidth and low power consumption. Due to these advantages, a back-end image processing system may directly acquire and process useful dynamic information in the field of view, so as to remarkably reduce the requirement on a storage capacity and a computation capability, and improve the real-time performance.

In a word, as a main characteristic, the dynamic vision sensor merely responds to the change in the light intensity in the field of view. During the implementation, a conventional dynamic vision sensor may not only detect very rapid movement in an actual scenario, but also capture the very slow change of the light intensity or very slow movement. In other words, the dynamic vision sensor may respond to the low-speed movement at a very low frequency, i.e., the dynamic vision sensor is not selective to the speed of the moving object. It is impossible for the dynamic vision sensor to differentiate the speed of the object, and instead, the dynamic vision sensor merely detects, and outputs, all movement situations of the object.

However, some problems are caused by the dynamic vision sensor when it responds to the slow change in the light intensity. On one hand, in actual use, usually the high-speed movement is of particular interest, and when the dynamic vision sensor responds to the slow change in the light intensity or the slow movement, the vision system is merely capable of differentiating the objects moving at different speeds through a back-end algorithm, resulting in a computation and storage burden of a back-end processing system. For example, in a scenario where whether a vehicle drives through a red light is monitored, it is expected to merely detect a vehicle running at a high speed. Actually, the conventional dynamic vision sensor may also detect objects moving at a low speed (e.g., pedestrians or vehicles running at a low speed). In this scenario, it is able to further reduce an output bandwidth of the dynamic vision sensor, reduce the requirement on the computation burden of the back-end system and improve the real-time performance of the system when an object of interest moving at a high speed, rather than an object moving at a low speed, is merely detected. Hence, during the real movement detection, it is very advantageous for the dynamic vision sensor to differentiate the objects moving at different speeds and give different responses. On the other hand, due to such a characteristic as being capable of responding to the low-frequency change in the light intensity, the dynamic vision sensor is susceptible to slow drift of the environmental light intensity or a low-frequency noise inside the sensor, and at this time, the dynamic vision sensor may output stray noise data irrelevant to the movement detection. Based on the above, there is an urgent need to provide a new image sensor so as to selectively detect the object moving at a certain speed.

SUMMARY

An object of the present disclosure is to provide a pixel collection circuit and an image sensor, so as to solve or at least alleviate at least one of the above-mentioned problems.

In one aspect, the present disclosure provides in some embodiments a pixel collection circuit, including: a photoelectric detection module configured to monitor an optical signal in real time and output a corresponding electric signal; a triggering generation module, a first input end of which is coupled to the photoelectric detection module, a first output end of which is coupled to an interface logic module, and which is configured to generate a triggering generation signal when a change frequency of the electric signal exceeds a predetermined frequency threshold and an amplitude of the electric signal meets a predetermined condition, and output the triggering generation signal to the interface logic module; and the interface logic module, a first input end of which is coupled to the triggering generation module, a second input end of which is coupled to a global resetting signal unit via a global resetting signal line, a first output end of which is coupled to the triggering generation module, and which is configured to output a triggering state signal upon the receipt of the triggering generation signal.

In a possible embodiment of the present disclosure, the triggering generation module includes: a pre-processing sub-module, an input end of which is coupled to an output end of the photoelectric detection module, and which is configured to pre-process the electric signal; and a threshold comparison sub-module, an input end of which is coupled to an output end of the pre-processing sub-module, and which is configured to receive a pre-processed electric signal from the pre-processing sub-module and generate the triggering generation signal when the amplitude of the electric signal meets the predetermined condition.

In a possible embodiment of the present disclosure, the pre-processing sub-module includes: a primary amplification sub-unit configured to preliminarily process the electric signal; and a speed threshold adjustment sub-unit coupled to a global speed threshold control unit via a first clock control signal line and a second clock control signal line, and configured to generate a predetermined frequency threshold in accordance with the received first clock control signal and second clock control signal, and determine whether the change frequency of the electric signal exceeds the predetermined frequency threshold.

In another aspect, the present disclosure provides in some embodiments an image sensor, including: a pixel collection circuit array including a plurality of the above-mentioned pixel collection circuits, and configured to monitor a change in a light intensity in a field of view and enter a triggered state when the change in the light intensity meets a predetermined condition; a global resetting control unit configured to transmit a global resetting signal to each pixel collection circuit so as to initialize the pixel collection circuit array; a global speed threshold control unit configured to transmit a first clock control signal and a second clock control signal to each pixel collection circuit; and a reading unit configured to respond to each pixel collection circuit in the triggered state and output corresponding address information.

In a possible embodiment of the present disclosure, the global speed threshold control unit is configured to be coupled to the pixel collection circuit via a first clock control signal line and a second clock control signal line, and the first clock control signal has a phase reverse to the second clock control signal.

In a possible embodiment of the present disclosure, the global speed threshold control unit includes: a frequency adjustment module configured to receive a reference clock signal at a fixed frequency and perform frequency division or frequency multiplication on the reference clock signal to generate a clock signal at a predetermined frequency; a phase adjustment module configured to receive the clock signal and generate two clock signals with reverse phases; and an amplitude adjustment module configured to adjust an amplitude of each of the two clock signals, and generate the first clock control signal and the second clock control signal.

According to the embodiments of the present disclosure, each pixel collection circuit of the image sensor may monitor the change in the light intensity at a corresponding position in the field of view in real time, and enter the triggered state when the change frequency of the light intensity exceeds the predetermined frequency threshold and the change in the light intensity meets the predetermined condition, so that the back-end reading unit may output the address information about the pixel collection circuit. As a result, it is able for the image sensor to merely output useful information generated when the change frequency exceeds the predetermined frequency threshold, thereby it is able to detect the high-speed movement in which a user is interested through setting the predetermined frequency threshold in accordance with the practical need.

In addition, apart from the pixel collection circuit, the image sensor further includes the global speed threshold control unit, so as to generate the operating clock signals at different frequencies in different application scenarios, thereby to accurately adjust the predetermined frequency threshold in real time.

BRIEF DESCRIPTION OF THE DRAWINGS

In order to achieve the above and related objects, some descriptive aspects will be described in conjunction with the following description and drawings, and these aspects indicate various ways capable of practicing a principle of the present disclosure. All aspects and equivalent aspects thereof shall fall within the scope of the present disclosure. The above and other objects, features and advantages will become more apparent on the basis of the drawings in conjunction with the following description. Same reference signs represent a same component or element.

DETAILED DESCRIPTION

The present disclosure will be described hereinafter in more details in conjunction with the drawings and embodiments. The following embodiments are for illustrative purposes only, but shall not be used to limit the scope of the present disclosure. In contrast, the following embodiments are provided so as to facilitate the understanding of the present disclosure.

As mentioned hereinabove, dynamic information in a field of view is detected by a dynamic vision sensor at a pixel level. Each pixel collection circuit (also called as pixel unit) in the sensor monitors a change in a light intensity in real time, and when the change reaches a certain threshold, outputs address information about the pixel collection circuit. Due to the movement of an object, the change in the light intensity occurs in a corresponding region in the field of view sensed by a corresponding pixel collection circuit, so the object moving in the field of view may be detected.

Figure 1:
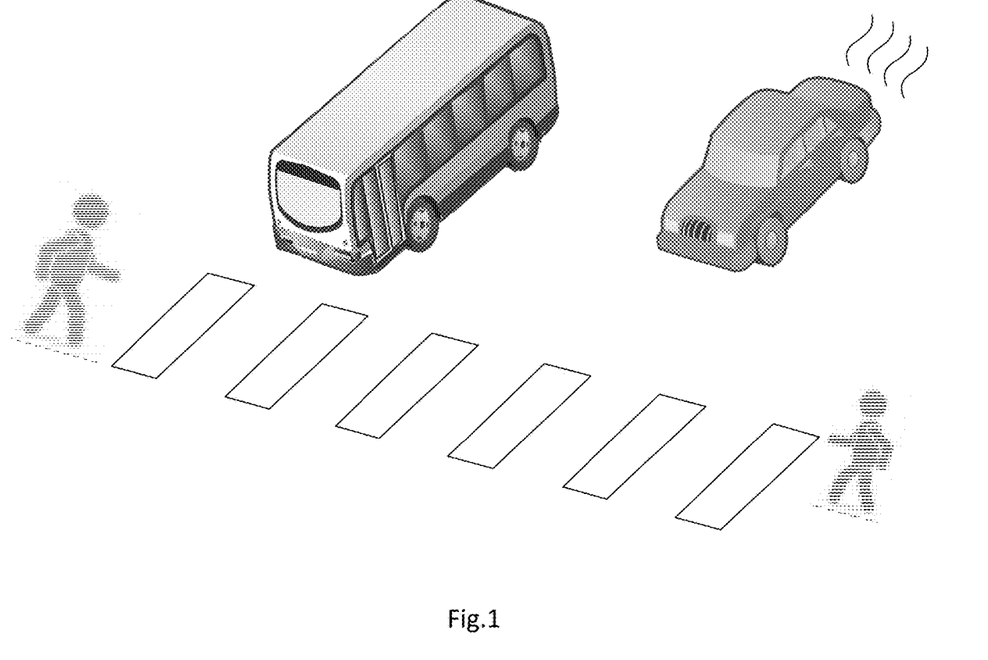
FIG. 1 is a schematic view showing a typical scenario where an image sensor is applied according to one embodiment of the present disclosure.

FIG. 1 is a schematic view showing a typical scenario where an image sensor (e.g., a dynamic vision sensor) is applied according to one embodiment of the present disclosure.

The scenario in FIG. 1 relates to the application of the dynamic vision sensor in monitoring and security protection, more specifically a scenario where whether a vehicle drives through a red light is monitored (it should be appreciated that, the image sensor in the embodiments of the present disclosure may also be applied in scenarios where merely a high-speed object is of particular interest, e.g., a scenario where a vehicle running at a speed greater than a speed limit on a highway is monitored). As shown in FIG. 1, there are vehicles running or stopping at a side of a zebra crossing, and pedestrians are about to walk through the zebra crossing. When a driver drives through the zebra crossing at a high speed in the case of a red traffic light, the pedestrians and the other vehicles running normally may be threatened. Hence, usually a camera (e.g., a dynamic vision sensor) is arranged in the vicinity of the zebra crossing, so as to monitor these vehicles.

A conventional dynamic vision sensor responds to the movements at various speeds as well as low-frequency interferences, so data outputted thereby includes both useful and useless information. In addition, there are fewer circumstances where vehicles drive through the red traffic light, so in most cases, the information outputted by the dynamic vision sensor is considered as useless information. For example, a pedestrian walking through the zebra crossing or a vehicle which slows down at a side of the zebra crossing, and even a slow change in an environmental light intensity, may be detected, and these information may be outputted by the dynamic vision sensor and filtered out through a back-end algorithm. At this time, a system bandwidth as well as requirements on a storage capacity and a computation capability of a back-end processing system increase inevitably.

In the application scenario, usually a target of interest, i.e., a vehicle driving through a red traffic light, drives through the zebra crossing at a larger speed, and in contrast, a speed of the other object (e.g., a vehicle that slows down, a pedestrian or a bicycle) is much smaller, so it is able to differentiate these objects from each other through setting an appropriate speed threshold.

Based on the above, the conventional dynamic vision sensor is improved so as to solve the above-mentioned problems. Generally, the image sensor may automatically filter out the vehicles and the pedestrians whose speed is smaller than a speed threshold, and it may merely output information about the vehicle that drives through the red traffic light at a speed greater than the speed threshold. In this way, it is able to remarkably reduce the requirement on a back-end processing system, thereby to improve the real-time performance of the system and reduce the cost of the system.

The image sensor in the embodiments of the present disclosure will be described hereinafter in details.

Figure 2:
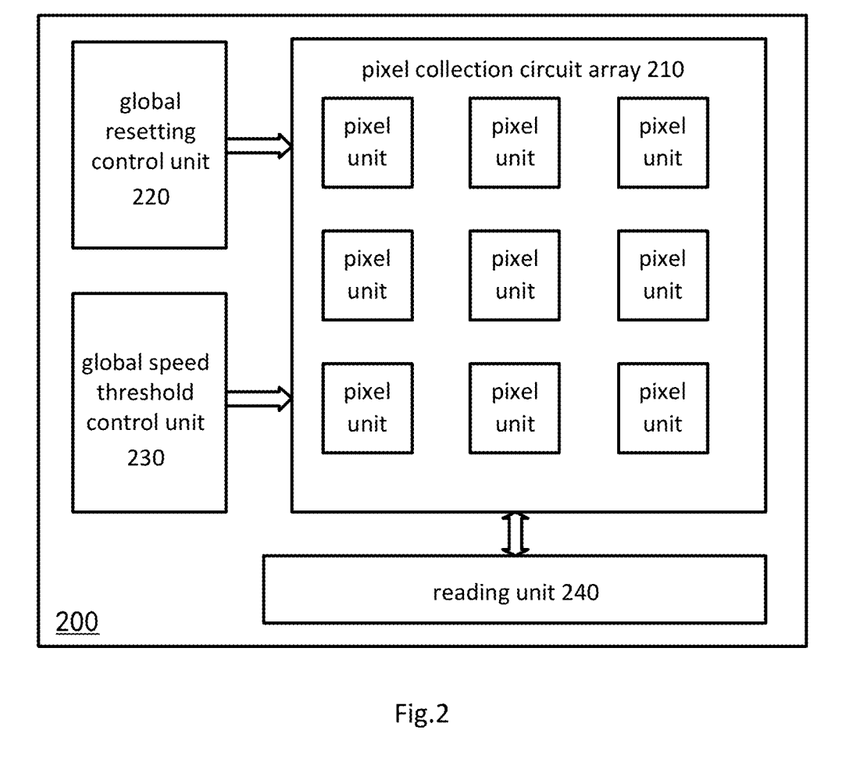
FIG. 2 is a schematic view showing an image sensor 200 according to one embodiment of the present disclosure.

FIG. 2 is a schematic view showing the image sensor 200 according to one embodiment of the present disclosure.

On the basis of a structure of the conventional dynamic vision sensor, a pixel collection circuit of the image sensor 200 is added with a circuit module, so that the pixel collection circuit responds to a speed of a change in a light intensity in a high-pass manner, i.e., it merely detects and responds to an object moving at a high speed greater than a predetermined speed threshold and automatically filters out an object moving at a speed smaller than the speed threshold. In some embodiments of the present disclosure, the circuit module may be implemented in the form of a switch capacitor circuit (which is equivalent to a continuous-time resistor with a very large resistance), and the speed threshold for the image sensor 200 is determined by the circuit module. The resistance of the resistor depends on a capacitance of the switch capacitor circuit and an operating clock frequency, and the capacitance and the clock frequency are parameters that do not vary along with an environment and that are capable of being controlled accurately, so the resistance and the speed threshold are capable of being controlled accurately.

In addition, apart from the pixel collection circuit, the image sensor may further include a global speed threshold control unit to generate an operating clock signal for the pixel collection circuit. In different application scenarios, the clock signals at different frequencies are generated through the speed threshold control unit, so as to accurately adjust the speed threshold in real time.

Through the above improvement, the image sensor 200 may accurately and reliably adjust a low threshold for the movement speed detection (i.e., the speed threshold) in different application scenarios, and automatically filter out the object moving at a speed smaller than the speed threshold, so as to selectively detect the movement. In addition, it is able to effectively reduce low-frequency stray noise data in the data output by the image sensor 200. Moreover, the image sensor 200 may be coupled to an external image collection system, and transmit the data to the image collection system for the subsequent calculation. Hence, according to the image sensor 200 in the embodiments of the present disclosure, it is able to not only reduce an output bandwidth of the sensor, but also reduce a requirement on a computation capability of the back-end image collection system.

As shown in FIG. 2, the image sensor 200 at least includes a pixel collection circuit array 210, a global resetting control unit 220, a global speed threshold control unit 230 and a reading unit 240. The global resetting control unit 220, the global speed threshold control unit 230 and the reading unit 240 are coupled to each pixel collection circuit of the pixel collection circuit array 210 via buses respectively. To be specific, the global resetting control unit 210 is coupled to each pixel collection circuit of the pixel collection circuit array 210 via a global resetting signal line, the global speed threshold control unit 230 is coupled to each pixel collection circuit of the pixel collection circuit array 210 via a first clock control signal line and a second clock control signal line, and the reading unit is coupled to each pixel collection circuit of the pixel collection circuit array 210 via a row request line, a row selection line, a column request line and a column selection line.

Figure 3:
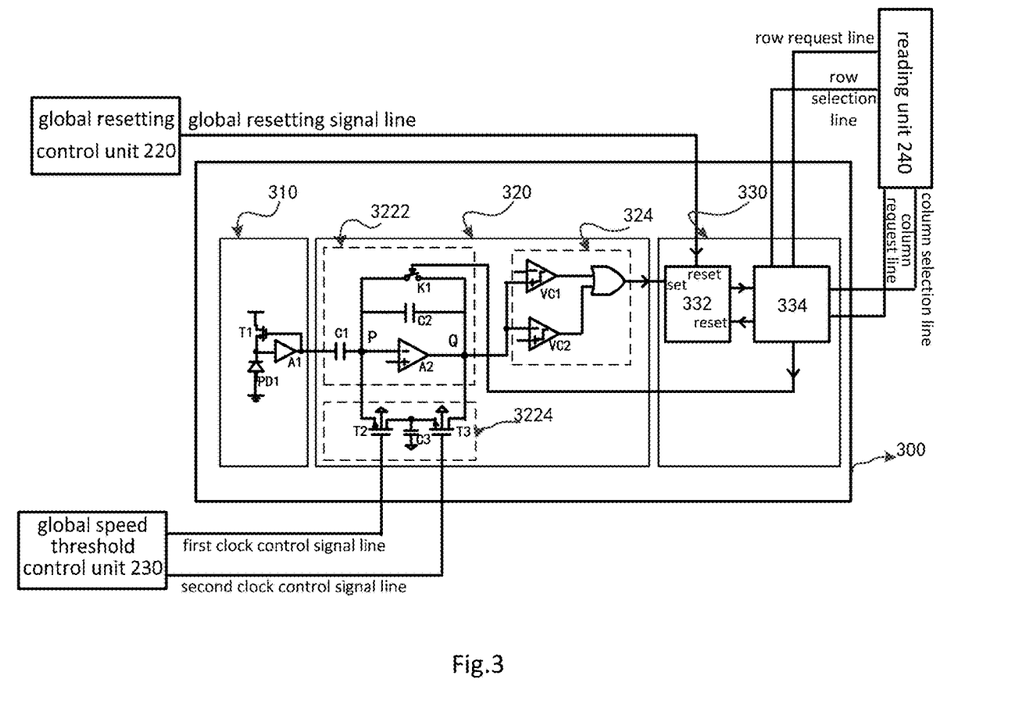
FIG. 3 is a schematic view showing a pixel collection circuit 300 according to one embodiment of the present disclosure.

The pixel collection circuit array 210 includes a plurality of pixel collection circuits. As shown in FIG. 2, the pixel collection circuit array 210 consists of a plurality of one-dimensional or two-dimensional pixel collection circuits (or pixel units), and FIG. 3 shows a structure of the pixel collection circuit 300. FIG. 2 shows a 3*3 pixel collection circuit array, but the pixel collection circuit array shall not be limited thereto. Each pixel collection circuit 300 may independently monitor a change in a light intensity at a corresponding region of a field of view in real time, and when the change in the light intensity meets a predetermined condition (e.g., an amplitude or a speed of the change in the light intensity exceeds a predetermined threshold), the pixel collection circuit 300 may be in a triggered state.

After the pixel collection circuit 300 enters the triggered state, it may transmit a request signal to the reading unit 240, and the reading unit 240 may respond to the pixel collection circuit in the triggered state and output address information about the pixel collection circuit (including a row address and a column address).

In a possible embodiment of the present disclosure, the reading unit 240 may at least include a row selection module, a column selection module and a reading control module. In a reading operation, the row selection module may manage a row request signal from the pixel collection circuit 300 in a row direction, and select one row through setting a certain row selection line as active. When a certain row has been selected, corresponding row address information may also be encoded by the reading unit 240 and transmitted to an external device. Correspondingly, the column selection module may manage a column request signal from the pixel collection circuit 300 in a column direction, and select one column through setting a certain column selection line as active. When a certain column has been selected, corresponding column address information may also be encoded by the reading unit 240 and transmitted to the external device. When all the pixel collection circuits in the triggered state in the selected row have been read by the column selection module, the reading control module may notify the row selection module to switch to a next row and repeat the above-mentioned reading operation.

In the embodiments of the present disclosure, the row selection module may receive the row request signal from at least one pixel collection circuit of the pixel collection circuit array 210 but merely output a row response signal with respect to one of the row request signals. In a possible embodiment of the present disclosure, the row selection module may respond to a plurality of row request signals sequentially through a scanner, or the row selection module may respond to the plurality of row request signals randomly. In order to prevent the occurrence of a conflict, the row selection module may merely respond to one row request signal each time. Correspondingly, the column selection module may receive the column request signal from at least one pixel collection circuit of the pixel collection circuit array 210 but merely output a column response signal with respect to one of the column request signals. In a possible embodiment of the present disclosure, the column selection module may respond to a plurality of column request signals sequentially through a scanner, or the column selection module may respond to the plurality of column request signals randomly. In order to prevent the occurrence of a conflict, the column selection module may merely respond to one column request signal each time.

In addition, the global resetting control unit 220 may transmit the global resetting signal to each pixel collection circuit 300 via the global resetting signal line, so as to initialize the pixel collection circuit array 210, and ensure that all the pixel collection circuits 300 are in a reliable resetting state when the image sensor 200 starts to work. In a possible embodiment of the present disclosure, during the initialization, the global resetting control unit 220 may transmit the global resetting signal to each pixel collection circuit 300 in the pixel collection circuit array 210 via the global resetting signal line, so as to turn off the pixel collection circuit 300, thereby to enable the pixel collection circuit 300 not to respond to the change in the light intensity in the field of view, and initialize the entire pixel collection circuit array 210. In addition, when the global resetting signal is active, the reading unit 240 may also be reset. At this time, the image sensor 200 may enter a light intensity detection resetting state, but may not respond to the change in the light intensity in the field of view, i.e., may not output any data. When the global resetting signal has been cancelled, the image sensor 200 may enter a light intensity detection enabled state and start to work normally.

The global speed threshold control unit 230 may transmit the first clock control signal and the second clock control signal to each pixel collection circuit 300 via the first clock control signal line and the second clock control signal line, so as to control the newly-added circuit module in the pixel collection circuit.

The pixel collection circuit 300 and the global speed threshold control unit in the image sensor 200 will be described hereinafter in conjunction with the drawings.

FIG. 3 is a schematic view showing the pixel collection circuit 300 according to one embodiment of the present disclosure. As shown in FIG. 3, the pixel collection circuit 300 includes a photoelectric detection module 310, a triggering generation module 320 and an interface logic module 330.

A first input end of the triggering generation module 320 is coupled to the photoelectric detection module 310, a first output end of the triggering generation module 320 is coupled to a first input end of the interface logic module 330, a second input end of the interface logic module 330 is coupled to the global resetting signal unit 220 via the global resetting signal line, and a first output end of the interface logic module 330 is coupled to the triggering generation module 320. In addition, a third input end and a fourth input end of the interface logic module 330 are coupled to the reading unit 240 via the row request line and the column request line respectively, and a second output end and a third output end of the interface logic module 330 are coupled to the reading unit 240 via the row selection line and the column selection line respectively.

The photoelectric detection module 310 is configured to monitor an optical signal in real time, and output a corresponding electric signal to the triggering generation module 320. In a possible embodiment of the present disclosure, the electric signal outputted by the photoelectric detection module 310 may be a voltage signal or a current signal, and usually there is a logarithmic relationship between the electric signal and the optical signal.

The photoelectric detection module 310 may be implemented in various forms, and the above is for illustrative purposes only. In the embodiments of the present disclosure, the photoelectric detection module 310 may be a logarithmic photoelectric detector. As shown in FIG. 3, the photoelectric detection module 310 includes a photodiode PD1 whose anode is grounded, a first transistor T1 and a first amplifier A1. A source electrode of the first transistor T1 is coupled to a cathode of the photodiode PD1, and a drain electrode thereof is coupled to a power source VDD. The first amplifier A1 is coupled between the cathode of the photodiode PD1 and a gate electrode of the first transistor T1. Here, the first amplifier A1 is configured to increase a response speed with respect to a voltage change between the source electrode and the gate electrode of the first transistor T1.

The triggering generation module 320 is configured to generate a triggering generation signal and output it to the interface logic module 330 when the electric signal outputted by the photoelectric detection module has met a predetermined condition. In the embodiments of the present disclosure, the predetermined condition refers to that the electric signal changes rapidly (a change rate exceeds a predetermined low threshold) and an amplitude thereof is sufficiently large.

In the embodiments of the present disclosure, the triggering generation module 320 may include a pre-processing sub-module 322 (not shown) and a threshold comparison sub-module 324. An input end of the pre-processing sub-module 322 is coupled to an output end of the photoelectric detection module 310, an input end of the threshold comparison sub-module 324 is coupled to an output end of the pre-processing sub-module 322, and an output end of the threshold comparison sub-module 324 is coupled to the interface logic module 330.

In a possible embodiment of the present disclosure, the pre-processing sub-module 322 may pre-process the electric signal and transmit a pre-processed electric signal to the threshold comparison sub-module 324. Here, the so-called "pre-processing" mainly refers to, but not limited to, amplification and/or filtration.

Different from a conventional pixel collection circuit, in the pixel collection circuit 300 in the embodiments of the present disclosure, the pre-processing sub-module 322 may include not only a primary amplification sub-unit 3222 but also a speed threshold adjustment sub-unit 3224.

As shown in FIG. 3, the electric signal generated by the photoelectric detection module 310 may be transmitted to the primary amplification sub-unit 3222, and the primary amplification sub-unit 3222 may preliminarily process the electric signal. In a possible embodiment of the present disclosure, the primary amplification sub-unit 3222 may isolate a direct current component in the electric signal from the photoelectric detection module 310, and merely extract and amplify an alternating current change signal in the electric signal, so as to increase the sensitivity of the pixel collection circuit 300 for the detection of the change in the light intensity. The speed threshold adjustment sub-unit 3224 may be connected in parallel to the primary amplification sub-unit 3222 in a certain way, so as to achieve a specific filtration operation of the pre-processing sub-module 322. Here, the filtration operation refers to the adjustment of the pre-processing sub-module 322 to amplify input signals at different frequencies. To be specific, the pre-processing sub-module 322 may attenuate and shield a signal about an object moving slowly at a frequency smaller than the predetermined frequency threshold, and amplify a signal about an object moving rapidly at a frequency greater than the predetermined frequency threshold and output the amplified signal to the threshold comparison module 324. In FIG. 3, the speed threshold adjustment sub-unit 3224 may be coupled to the global speed threshold control unit 230 via the first clock control signal line and the second clock control signal line, so as to generate the predetermined frequency threshold (which corresponds to a speed threshold for the movement detection) in accordance with the received first clock control signal and second clock control signal. It should be appreciated that, FIG. 3 merely shows one implementation mode of the pre-processing sub-module 322, and the pre-processing sub-module 322 shall not be limited thereto.

In some embodiments of the present disclosure, the primary amplification sub-units 3222 may be implemented in various forms, and FIG. 3 shows one of them. As shown in FIG. 3, the primary amplification sub-unit 3222 includes a first capacitor C1, a second amplifier A2, a second capacitor C2 and a first switch K1. A first end of the first capacitor C1 is coupled to the output end of the photoelectric detection module 310, an input negative pole of the second amplifier A2 is coupled to a second end of the first capacitor C1, and an input positive pole of the second amplifier A2 is configured to receive a fixed potential. The second capacitor C2 and the first switch K1 are connected in parallel between the input negative pole and an output end of the second amplifier A2.

As shown in FIG. 3, the speed threshold adjustment sub-unit 3224 includes a second transistor T2, a third transistor T3 and a third capacitor C3. In FIG. 3, the second transistor T2 and the third transistor T3 are both N-type transistors. A source electrode of the second transistor T2 is coupled to the input negative pole of the second amplifier A2, a drain electrode of the second transistor T2 is coupled to a source electrode of the third transistor T3, and a drain electrode of the third transistor T3 is coupled to the output end of the second amplifier A2. A first end of the third capacitor C3 is coupled to the drain electrode of the second transistor T2 and the source electrode of the third transistor T3, and a second end thereof is grounded. In addition, a gate electrode of the second transistor T2 is coupled to the global speed threshold control unit 230 via the first clock control signal line, and a gate electrode of the third transistor T3 is coupled to the global speed threshold control unit 230 via the second clock control signal line. In this way, the global speed threshold control unit 230 may output the first clock control signal and the second clock control signal, as gate electrode voltages of the second transistor T2 and the third transistor T3, to the speed threshold adjustment sub-unit 3224 via the first clock control signal line and the second clock control signal line respectively. In addition, the first clock control signal has a phase reverse to the second clock control signal, so it is able to turn on the second transistor T2 and the third transistor T3 alternately.

Figure 4:
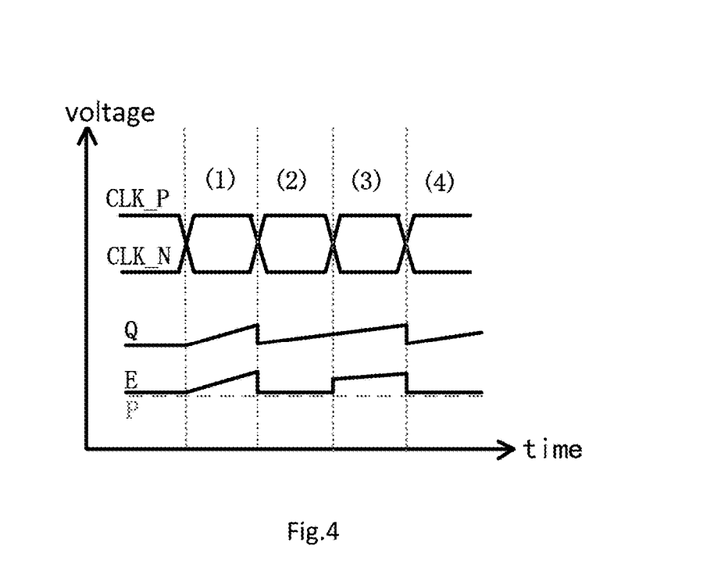
FIG. 4 is a sequence diagram of a pre-processing sub-module 322 according to one embodiment of the present disclosure.

FIG. 4 is a sequence diagram of the pre-processing sub-module 322 in FIG. 3. More specifically, FIG. 4 is a sequence diagram of the pre-processing sub-module 322 after the first switch K1 has been turned off. For ease of description, an input node and an output node of the second amplifier A2 are marked as P and Q respectively, the drain electrode of the second transistor T2 (or the source electrode of the third transistor T3) is marked as E, and the gate electrode voltages of the second transistor T2 and the third transistor T3 are marked as CLK_P and CLK_N respectively.

Four phases, i.e., (1) to (4), are marked chronologically in FIG. 4, where an x-axis represents time t, and a y-axis represents a voltage V. At the phase (1), CLK_P is a low level, and CLK_N is a high level, so the second transistor T2 is turned off and the third transistor T3 is turned on. Due to the change in the light intensity at a low frequency or a low-frequency noise caused by slow movement, an amplitude of the electric signal from the photoelectric detection unit 310 may change, and thereby a potential at the output node Q of the second amplifier A2 may be shifted correspondingly. In FIG. 4, the potential at the output node Q increases gradually. Because the third transistor T3 is turned on, a potential at the third capacitor C3, i.e., a potential at E, may be the same as the potential at Q, and it may increase slowly. At the phase (2), CLK_P is a high level, and CLK_N is a low level, so the second transistor T2 is turned on and the third transistor T3 is turned off. Because at the phase (1), the potential at E increases to be higher than a potential at P, the potential at E at the phase (2) needs to be pulled down to the potential at P due to a negative feedback effect. On the basis of a low of charge conservation, superfluous positive changes on the third capacitor C3 may be accumulated at a left electrode plate of the second capacitor C2, so the potential at Q may decrease. Next, at the phases (3) and (4), the operations at the phases (1) and (2) may be performed repeatedly. In another circumstance where the potential at Q decreases gradually, because the third transistor T3 is turned on, the potential at E may decrease slowly too. At the phase (2), CLK_P is a high level, and CLK_N is a low level, so the second transistor T2 is turned on and the third transistor T3 is turned off. Because at the phase (1), the potential at E decreases to be lower than the potential at P, the potential at E at the phase (2) needs to be pulled up to the potential at P due to a negative feedback effect. On the basis of the low of charge conservation, superfluous negative changes on the third capacitor C3 may be accumulated at the left electrode plate of the second capacitor C2, so the potential at Q may increase.

From another point of view, each time when the CLK_P changes to a high level (i.e., the second transistor T2 is turned on and the third transistor T3 is turned off), the potential at Q may change in a direction opposite to a previous change direction, so as to maintain a relatively stable potential. In the case that a clock period (i.e., periods of CLK_P and CLK_N) and a capacitance of the third capacitor C3 are constant, for the change in the light intensity for an object moving at a low speed, because the potential at Q fluctuates within a small range within one period, the change in the potential at Q within each period may always cancel out the previous change in a reverse direction, so as to approximately maintain Q at a constant potential, i.e., the pixel collection circuit may not respond to the change in the light intensity for the low-speed movement. For the change in the light intensity for an object moving at a speed greater than the predetermined speed threshold, because the potential at Q fluctuates within a large range within one period, even if the potential at Q changes within each period, it is still insufficient for the change in the potential at Q to cancel out the previous change in a reverse direction. Hence, at this time, the potential at Q may change along with the change in the light intensity, i.e., the pixel collection circuit may still respond to the change in the light intensity for the object moving at a high speed.

Based on the above, due to the speed threshold adjustment sub-unit 3224, the pixel collection circuit 300 may respond to the change in the light intensity in a high-pass manner, i.e., it may shield the change in the light intensity at a frequency lower than the predetermined frequency threshold and merely respond to the change at a frequency greater than the predetermined frequency threshold, so the pixel collection circuit may merely detect the object moving at a speed greater than the predetermined speed threshold. In addition, the predetermined frequency threshold depends on a switching frequency of CLK_P and CLK_N as well as the capacitance of the third capacitor C3. Quantitative analysis shows that, the predetermined frequency threshold f at which the pixel collection circuit 300 responds to the speed of the change in the light intensity (i.e., the frequency of the change in the light intensity) is equal to a product of a clock frequency f_CLK of the speed threshold adjustment sub-unit 3224 and a quotient of a third capacitance of the third capacitor and a second capacitance of the second capacitor (i.e., C3/C2), where f_CLK represents a switching frequency of the first clock control signal and the second clock control signal. In the case of C3 and C2 are constant, the larger the value of f-CLK, the shorter the period. For the change in the light intensity at a certain speed, it is more difficult to accumulate a sufficient change amplitude at Q, and the constant change in the reverse direction at Q may easily cancel out the amplitude. Hence, when the predetermined frequency threshold f is larger, the pixel collection circuit may respond to the change in the light intensity for an object moving at a larger speed. In the case that the value of f_CLK is constant, the larger the capacitance C3, the larger the change of the potential at Q in the reverse direction within each period, and the easier to cancel out the change amplitude previously accumulated at Q. At this time, the predetermined frequency threshold f may increase. Hence, in the speed threshold adjustment sub-unit 3224, the predetermined frequency threshold f at which the pixel collection circuit responds to the change in the light intensity merely depends on the clock frequency f_CLK and the capacitance of the third capacitor C3. The clock frequency f_CLK may be accurately controlled by an external unit, and the capacitor may be implemented accurately in a process for manufacturing an integrated circuit, so the predetermined frequency threshold f may be controlled accurately and it is insusceptible to a processed offset and an environmental change. In other words, when the predetermined frequency threshold f has been set through selecting the clock frequency f_CLK and the capacitance of the third capacitor C3, e.g., when f=10 Hz, for different chips and in different environments, and even for all pixel collection circuits in a same chip, the predetermined frequency threshold may be 10 Hz. As a result, it is able to remarkably improve the stability of the predetermined frequency threshold, thereby to improve the reliability and practicability of the entire image sensor 200.

In addition, in the embodiments of the present disclosure, when the first switch K1 is turned on, the output end of the pre-processing sub-module 322 may be set at a constant potential, and the pre-processing sub-module 322 may not respond to an output of the photoelectric detection module 310, so the pixel collection circuit 300 may not respond to the change in the light intensity. When the first switch K1 is turned off, the pre-processing sub-module 322 may respond to a change in the output of the photoelectric detection module 310, i.e., the pixel collection circuit 300 may respond to the change in the light intensity. During the implementation, the first switch K1 is usually a single transistor.

Figure 5A:
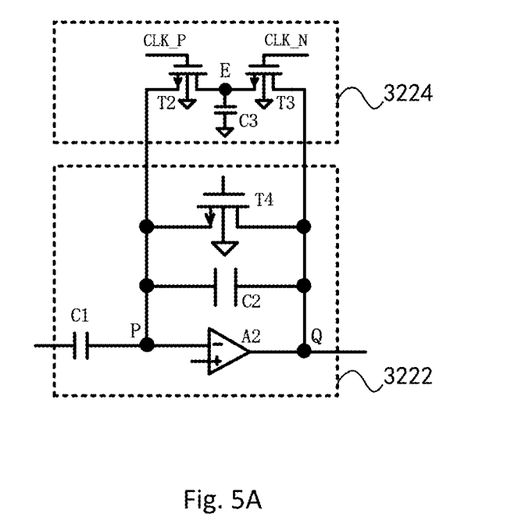
FIGS. 5A-5C are schematic views showing the pre-processing sub-module 322 according to one embodiment of the present disclosure.
Figure 5B:
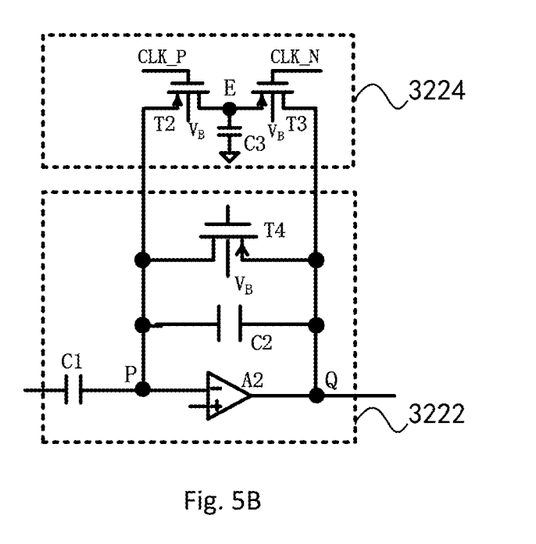
Figure 5C:
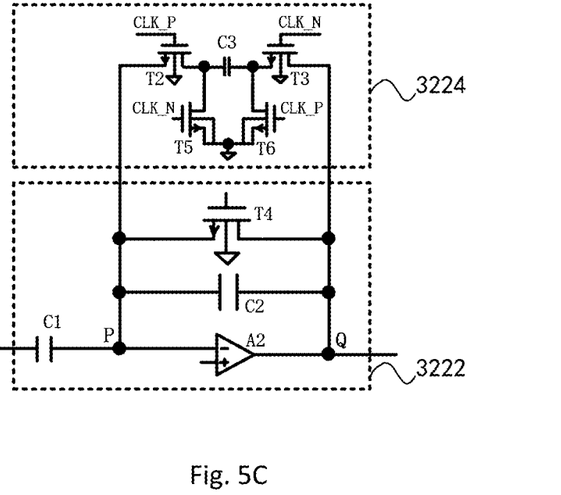

Based on the above, in the embodiments of the present disclosure, the pre-processing sub-module 322 may also be implemented in any other forms. FIGS. 5A to 5C show the pre-processing sub-module 322 according to some other embodiments of the present disclosure (based on a working principle in FIG. 4, the nodes P, Q and E as well as the gate electrode voltages CLK_P and CLK_N are also marked at corresponding positions in FIGS. 5A to 5C).

In FIG. 5A, the first capacitor C1, the second amplifier A2, the second capacitor C2 and a fourth transistor T4 (i.e., the first switch K1) together form the primary amplification sub-unit 3222, and the second transistor T2, the third transistor T3 and the third capacitor C3 together form the speed threshold adjustment sub-unit 3224.

In FIG. 5A, in the primary amplification sub-unit 3222, an N-type transistor T4 is connected in parallel to the second amplifier A2. A source electrode of the transistor T4 is coupled to the input negative pole of the second amplifier A2, and a drain electrode thereof is coupled to the output end of the second amplifier A2. Considering that the transistor T4 has a very large equivalent resistance in an off state and the equivalent resistance is susceptible to the process offset and an environmental temperature, an RC network consisting of the transistor T4 and the second capacitor C2 has a very bad filtration effect. Hence, on the basis of the primary amplification sub-unit 3222, the speed threshold adjustment sub-unit 3224 may be added. In the speed threshold adjustment sub-unit 3224, the source electrode of the second transistor T2 is coupled to the input negative pole of the second amplifier A2, the drain electrode of the second transistor T2 is coupled to the source electrode of the third transistor T3, the drain electrode of the third transistor T3 is coupled to the output end of the second amplifier A2, one end of the third capacitor C3 is coupled to the drain electrode of the second transistor T2 and the source electrode of the third transistor T3, and the other end of the third capacitor C3 is grounded. As mentioned hereinabove, the second transistor T2 and the third transistor T3 are both N-type transistors. The gate electrode voltages CLK_P and CLK_N of T2 and T3 are clock signals with reverse phases, and they are generated by the global speed threshold control unit 230 so as to turn on T2 and T3 alternately.

In FIG. 5B, in the primary amplification sub-unit 3222, the first switch K1 is a P-type transistor (i.e., the fourth transistor T4). A drain electrode of the fourth transistor T4 is coupled to the input negative pole of the second amplifier A2, a source electrode thereof is coupled to the output end of the second amplifier A2, and a substrate thereof is configured to receive a fixed potential $V_B$. In the speed adjustment sub-unit 3224, the second transistor T2 and the third transistor T3 are both P-type transistors, and a substrate of each of the second transistor T2 and the third transistor T3 is configured to receive the fixed potential $V_B$. Through setting $V_B$ to be approximately equal to the potential at P, it is able to set the predetermined frequency threshold in a stable and reliable manner, and remarkably prevent the pixel collection circuit 300 from being adversely affected by a leakage current of the first switch.

In FIG. 5C, the primary amplification sub-unit 3222 has a same structure as that in FIG. 5A. The speed threshold adjustment sub-unit 3224 consists of four N-type transistors and the third capacitor C3, and the four N-type transistors include a second transistor T2, a third transistor T3, a fifth transistor T5 and a sixth transistor T6. A source electrode of T2 is coupled to the input negative pole of the second amplifier A2, a drain electrode of T2 is coupled to the first end of the third capacitor C3, a source electrode of T3 is coupled to the second end of the third capacitor C3, a drain electrode of T3 is coupled to the output end of the second amplifier A2 (i.e., the third capacitor C3 is connected between the drain electrode of T2 and the source electrode of T3), source electrodes of T5 and T6 are grounded, a drain electrode of T5 is coupled to the first end of the third capacitor C3, and a drain electrode of T6 is coupled to the second end of the third capacitor C3. Gate electrodes of T2 and T6 are coupled to the global speed threshold control unit 230 via the first clock control signal line (i.e., the gate electrode voltage is marked as CLK_P), and gate electrodes of T3 and T5 are coupled to the global speed threshold control unit 230 via the second clock control signal line (i.e., the gate electrode voltage is marked as CLK_N). When CLK_P is a low level and CLK_N is a high level, a potential at each end of the third capacitor C3 may change along with the potential at Q. When CLK_P is a high level and CLK_N is a low level, the potential at Q may change in a reverse direction due to the potential at each end of the third capacitor C3, and thereby an effect like that in FIG. 4 may be achieved.

It should be appreciated that, the structure of the pre-processing sub-module 322 may not be limited to those mentioned hereinabove. Based on the structure and the working principle of the pre-processing sub-module 322, a person skilled in the art will know the other implementation modes, which also fall within the scope of the present disclosure.

Based on the above description, the response of the pixel collection circuit 300 to the change in the light intensity for objects at different speeds may depend on the pre-processing sub-module 322. In order to further describe the advantages of the pre-processing sub-module 322, a working principle of a pre-processing sub-module in the conventional dynamic vision sensor (i.e., the pre-processing sub-module merely includes the primary amplification sub-unit 3222, and in order to differentiate them from each other, the pre-processing sub-module in the conventional dynamic vision sensor is directly called as original pro-processing unit) will be described hereinafter.

As mentioned hereinabove, when the first switch K1 is turned on, an output end of the original pre-processing unit is set to be at a constant potential, so the original pre-processing unit may not respond to the output of the photoelectric detection module, and the entire pixel unit may not respond to the change in the external light intensity. When the first switch K1 is turned off, the original processing unit may respond to a change in the output of the front-end photoelectric detection module, i.e., respond to the change in the light intensity.

Figure 6:
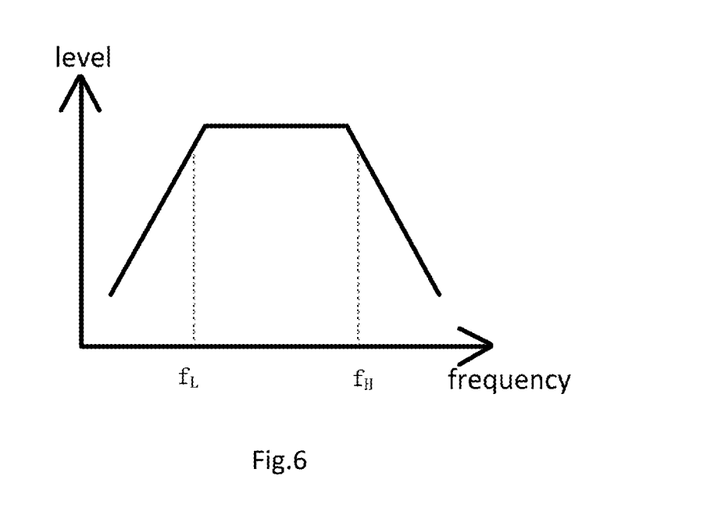
FIG. 6 is a frequency response curve of an output of an original pre-processing unit to an output of a photoelectric detection module.

Further, FIG. 6 shows a frequency response curve of the output of the original pre-processing unit to the output of the photoelectric detection module. This is a typical bandpass system, a low threshold $f_L$ depends on an RC network consisting of an equivalent resistor R when the first switch K1 is turned off and the second capacitor C2. In the case that the capacitance of the second capacitor C2 is constant, the larger the resistance of the resistor R, the smaller the value of $f_L$, the lower the frequency of the output signal from the photoelectric detection module to which the original pre-processing unit is capable of responding, and the lower the speed threshold of the change in the light intensity capable of being detected by the pixel unit. It means that, the conventional dynamic vision sensor may detect the object moving at a smaller speed.

Generally speaking, the first switch K1 is implemented in the form of a single transistor. When the transistor is in an off state, its equivalent resistance is very large, i.e., an ON resistance of the first switch K1 in the off state is very large, so $f_L$ may be as low as a few tenths of Hz. In this case, it is considered that the dynamic vision sensor may detect an object moving at an extremely low speed. In addition, a high threshold $f_H$ of the original pre-processing unit usually depends on a bandwidth of the second amplifier A2, and this bandwidth is sufficiently high relative to the movement speed in most application scenarios.

Based on the above, it is considered that the pixel unit of the conventional dynamic vision sensor may respond to the speed of the detected object in an all-pass manner, and it may detect an object moving at a very low speed or an object moving at a high speed, i.e., it is not selective to the speed. In addition, there exists a low-frequency noise for the pixel unit itself, and this noise includes a heat noise from the circuit module and, as a majority, a noise caused by a substrate leakage current of the first switch K1 in the off state. The output of the original pre-processing unit may also be affected by the low-frequency noise, so the output of the conventional dynamic vision sensor may include some low-frequency noise data.

Based on the above, through the pre-processing sub-module 322 in the embodiments of the present disclosure, it is able to solve the problem in the related art where the conventional dynamic vision sensor is not selective to the movement speed. In addition, some low-frequency noise interference sources may be filtered out by the pre-processing sub-module 322, so it is able to remarkably reduce the amount of the low-frequency noise data in the output of the image sensor 200.

The threshold comparison sub-module 324 may receive the electric signal processed by the pre-processed sub-module 322, and when the amplitude of the received electric signal meets the predetermined condition, generate the triggering generation signal.

FIG. 3 shows one implementation mode of the threshold comparison sub-module 324. As shown in FIG. 3, the threshold comparison sub-module 324 includes a first voltage comparator VC1, a second voltage comparator VC2 and an OR logic unit. A reverse-phase input end of the first voltage comparator VC1 is configured to receive a fixed level representing a first threshold, and a same-phase input end thereof is coupled to the output end of the pre-processing sub-module. A same-phase input end of the second voltage comparator VC2 is configured to receive another fixed level representing a second threshold, and a reverse-phase input end thereof is coupled to the output end of the pre-processing sub-module. The OR logic unit is coupled to output ends of the first voltage comparator VC1 and the second voltage comparator VC2, and configured to perform an OR logic operation on outputs of the first voltage comparator and the second voltage comparator. In a possible embodiment of the present disclosure, when the electric signal processed by the pre-processing sub-module 322 is greater than the first threshold or smaller than the second threshold (in a possible embodiment of the present disclosure, the first threshold is greater than the second threshold), the OR logic unit may generate the triggering generation signal and output it to the interface logic unit 330.

The interface logic module 330 may output a triggered state signal upon the receipt of the triggering generation signal. As shown in FIG. 3, the interface logic module 330 includes a latch 332 and a handshake protocol control logic sub-module 334.

In a possible embodiment of the present disclosure, the latch 332 is configured to store and represent a current operating state of the pixel collection circuit 300. A first resetting signal of the latch 332 is a global resetting signal generated by the global resetting control unit 220, a second resetting signal thereof is an output signal from the handshake protocol control logic sub-module 334, and a setting signal thereof is the triggering generation signal from the triggering generation module 320. In the embodiments of the present disclosure, during the initialization of the pixel collection circuit 300, the global resetting signal may be active, and at this time, the latch 332 may be reset. Upon the receipt of the triggering generation signal from the triggering generation module 320, the latch 332 may be set, and the pixel collection circuit 300 may enter the triggered state.

The handshake protocol control logic sub-module 334 is configured to process an interaction between the primary pixel collection circuit 300 and the reading unit 240. This interaction may be implemented through the row request line and the row selection line in the row direction as well as the column request line and the column selection line in the column direction. As mentioned hereinabove, the row request line and the row selection line may be shared by the pixel units in one row, and the column request line and the column selection line may be shared by the pixel units in one column. When the latch 332 has been set, it may transit a signal to the handshake protocol control logic sub-module 334. The handshake protocol control logic sub-module 334 may be activated, and transmit the row request signal to the reading unit 240. In response to the row request signal, the reading unit 240 may generate a corresponding row selection signal, and the handshake protocol control logic sub-module 334 may set the column request signal as active. The reading unit 240 may respond to the column request signal in the column direction, and generate a corresponding column selection signal. Upon the receipt of the row selection signal and the column selection signal simultaneously, the handshake protocol control logic sub-module 334 may output the second resetting signal to the latch 332, so as to reset the latch 332 again.

In another possible embodiment of the present disclosure, the handshake protocol control logic sub-module 334 may further manage the triggering generation module 320. More specifically, the handshake protocol control logic sub-module 334 may generate a control signal and output it to the first switch K1 of the pre-processing sub-module 322, so as to manage the triggering generation module 320.

In the embodiments of the present disclosure, When the pixel collection circuit array 210 is initialized or when the pixel collection circuit 300 enters the triggered state, the handshake protocol control logic sub-module 334 may output the control signal so as to turn on the first switch K1, thereby to enable the pre-processing sub-module 322 not to respond to the output of the photoelectric detection unit 310, i.e., enable the pixel collection circuit 300 not to detect the change in the light intensity. In addition, as mentioned hereinabove, upon the receipt of the row selection signal and the column selection signal simultaneously, the handshake protocol control logic sub-module 334 may reset the latch 332 through the second resetting signal, and then the first switch K1 may be turned off and the pixel collection circuit 300 may respond to the change in the light intensity again.

It should be appreciated that, when the first switch K1 is implemented in the form of transistor, e.g., the fourth transistor T1 in FIGS. 5A to 5C, the gate electrode of the fourth transistor T4 may receive the control signal from the handshake protocol control logic sub-module 334.

Based on the above description, the pixel collection circuit 300 in the embodiments of the present disclosure may accurately set the predetermined frequency threshold for the detection of the change in the light intensity without being affected by the process offset as well as the change in the environment. In some other embodiments of the present disclosure, the pixel collection circuit 300 may adjust the predetermined frequency threshold in real time according to the practical need.

Based on the above, the predetermined speed threshold f introduced by the speed threshold adjustment sub-unit 3224 of the pixel collection circuit 300 may merely depend on the operating clock frequency f_CLK and the capacitance of the third capacitor C3. During the implementation, usually the capacitance of the third capacitor C3 is constant and hard to be adjusted. Hence, in some other embodiments of the present disclosure, the predetermined frequency threshold may be adjusted in real time through changing the clock frequency f_CLK. To be specific, when the clock frequency f_CLK increases, the predetermined frequency threshold may increase correspondingly, and when the clock frequency f_CLK decreases, the predetermined frequency threshold may decrease correspondingly. All the pixel collection circuits 300 need to be provided with the same predetermined frequency threshold, so the global speed threshold control unit 230 may be provided. Through controlling the global speed threshold control unit 230, the first clock control signal and the second clock control signal at different frequencies may be generated in different application scenarios, so as to accurately adjust the predetermined frequency threshold in real time.

Figure 7:
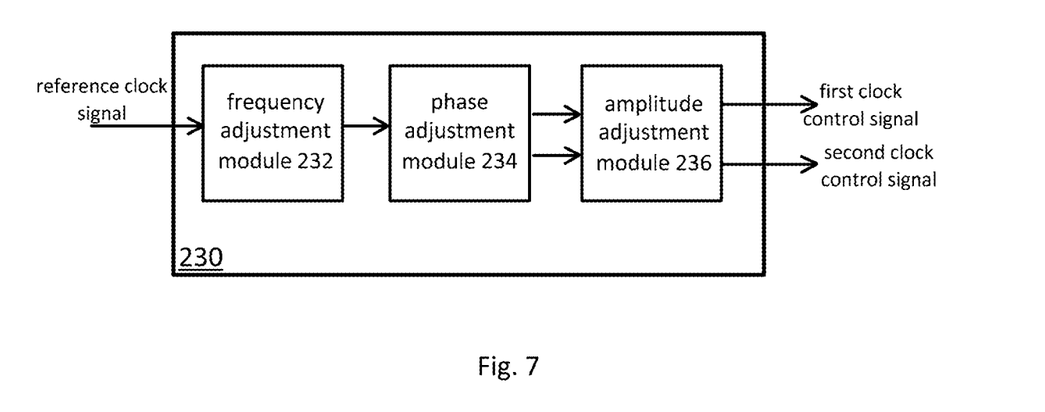
FIG. 7 is a schematic view showing a global speed threshold control unit 230 according to one embodiment of the present disclosure.

FIG. 7 is a schematic view of the global speed threshold control unit 230. As shown in FIG. 7, the global speed threshold control unit 230 includes a frequency adjustment module 232, a phase adjustment module 234 and an amplitude adjustment module 236.

In a possible embodiment of the present disclosure, the frequency adjustment module 232 is configured to receive a reference clock signal at a fixed frequency, and perform frequency division or frequency multiplication on the reference clock signal to generate a clock signal at a predetermined frequency. The phase adjustment module 234 is configured to receive the clock signal and generate two clock signals with reverse phases. The amplitude adjustment module 236 is configured to adjust an amplitude of each of the two clock signals, generate the first clock control signal and the second clock control signal, and output them to the pixel collection circuit (i.e., the speed threshold adjustment sub-unit 3224). Generally speaking, the amplitude adjustment module 236 may attenuate, to some extent, the amplitude of each full-swing clock signal, so as to prevent the clock signal from interfering with the other modules of the pixel collection circuit 300.

In the embodiments of the present disclosure, the frequency adjustment module 232 may generate the clock signals at different frequencies, so that the pixel collection circuit 300 may adjust the predetermined frequency threshold for the detection of the change in the light intensity in real time.

During the implementation, the frequency adjustment module 232 may be a frequency synthesizer circuit consisting of phase-locked loops. However, the clock signal for the speed threshold adjustment sub-unit 3224 of the pixel collection circuit 300 usually has a low frequency, and when the reference clock signal has a high frequency, the frequency adjustment module 232 may also be merely implemented in the form of a simple frequency division circuit, and at this time, its frequency-division parameters may be controlled externally.

The phase adjustment module 234 may include a clock buffer and a clock phase inverter, so as to convert a single-polarity clock input signal from the frequency adjustment module 232 into two clock signals with reverse phases.

The amplitude adjustment module 235 may be a simple clock buffer. In a possible embodiment of the present disclosure, in order to achieve an amplitude adjustment function, a power source voltage of the buffer may be a certain level signal rather than a full-swing power source voltage.

According to the image sensor 200 in the embodiments of the present disclosure, on the basis of the conventional dynamic vision sensor, the speed threshold adjustment sub-unit 3224 may be introduced into the pixel collection circuit 300, so as to provide a continuous-time equivalent resistor with a very large resistance. The low threshold (i.e., the predetermined frequency threshold) of the image sensor 200 for responding to the movement speed may depend on the resistor. In the embodiments of the present disclosure, based on the above analysis, the resistance of the equivalent resistor merely depends on the capacitance of the switch capacitor circuit (i.e., the resistance of the third capacitor) as well as the operating clock frequency. The capacitance and the clock frequency are parameters that do not vary along with an environment and that are capable of being controlled accurately, so the resistance and the low threshold are capable of being controlled accurately.

In addition, apart from the pixel collection circuit 300, the global speed threshold control unit 230 may be introduced so as to generate the operating clock signal for the speed threshold adjustment sub-unit 3224. Through controlling the global speed threshold control unit 230, the operating clock signals at different frequencies may be generated in different application scenarios, so as to accurately adjust the predetermined frequency threshold in real time.

Based on the above, through the cooperation of the global speed threshold control unit 230 and the speed threshold adjustment sub-unit 3224, it is able to accurately and reliably adjust the predetermined frequency threshold for the detection of the movement speed in different application scenarios. As a result, it is able to reduce the amount of the low-frequency stray noise data from the image sensor 200, and automatically filter out the object moving at a speed smaller than the predetermined frequency threshold. In addition, it is able to reduce the output bandwidth of the image sensor as well as the requirement on the computation capability of the back-end processing system.

It should be appreciated that, although with a large number of details, these specific details are not necessary for the implementation of the present disclosure. In some embodiments of the present disclosure, the known method, structure or technology is not shown, so as to facilitate the understanding of the present disclosure in a better manner.

It should be further appreciated that, sometimes the features of the present disclosure are described in conjunction with a single embodiment or figure, so as to facilitate the understanding of one or more aspects of the present disclosure. However, the method in the present disclosure shall not be construed as to reflect the intention that the present disclosure asks for more features than those specified in each claims. More definitely, as reflected in the appended claims, the creative aspect lies in the features less than all the features in the above-mentioned single embodiment. Hence, each claim following a specific embodiment may be definitely incorporated into the specific embodiment, and each claim itself may serve as an individual embodiment of the present disclosure.

It should be further appreciated that, modules, units or components in the above examples may be arranged in the device described in the embodiments, or in one or more devices different from the device. The modules may be combined into one module, or each module may be divided into a plurality of submodules.

It should be further appreciated that, the modules may be modified adaptively and arranged in one or more devices different from that mentioned hereinabove. The modules, units or components may be combined into one module, unit or component, or each module, unit or component may be divided into a plurality of submodules, subunits or subcomponents. Apart from the features, processes or units conflicting with each other, all the features, processes or units involved in the specification (including the appended claims, abstract and drawings) may be combined in any form. Unless otherwise defined, each feature in the specification (including the appended claims, abstract and drawings) may be replaced with a same, equivalent or similar feature.

The followings are also provided in the embodiments of the present disclosure.

A9. The pixel collection circuit according to any one of A1 to A8, wherein a third input end and a fourth input end of the interface logic module are coupled to the reading unit via a row request line and a column request line, and a second output end and a third output end of the interface logic module are coupled to the reading unit via a row selection line and a column selection line. A10. The pixel collection circuit according to any one of A1 to A9, wherein the interface logic module includes: a latch configured to store and represent a current operating state of the pixel collection circuit, a first resetting signal of the latching being a global resetting signal generated by the global resetting control unit, a second resetting signal being an output signal from a handshake protocol control logic sub-module, and a setting signal being a triggering generation signal generated by the triggering generation module; and the handshake protocol control logic sub-module configured to process an interaction between the pixel collection circuit and the reading unit, and manage the triggering generation module. A11. The pixel collection circuit according to A9, wherein the handshake protocol control logic sub-module is further configured to output a control signal to a first switch (K1) of the pre-processing sub-module. A12. The pixel collection circuit according to A11, wherein the handshake protocol control logic sub-module is further configured to output the control signal to turn off the first switch (K1) when the pixel collection circuit enters a triggered state. A13. The pixel collection circuit according to any one of A2 to A12, wherein the threshold comparison sub-module includes: a first voltage comparator (VC1), a reverse-phase input end of which is configured to receive a fixed level representing a first threshold, and a same-phase input end of which is coupled to an output end of the pre-processing sub-module; a second voltage comparator (VC2), a same-phase input end of which is configured to receive a fixed level representing a second threshold, and a reverse-phase input end of which is coupled to the output end of the pre-processing sub-module; and an OR logic unit coupled to output ends of the first voltage comparator and the second voltage comparator, and configured to perform an OR logic operation on outputs of the first voltage comparator and the second voltage comparator. A14. The pixel collection circuit according to any one of A1 to A13, wherein the photoelectric detection module includes: a photodiode (PD1) whose anode is grounded; a first transistor (T1), a source electrode of which is coupled to a cathode of the photodiode and a drain electrode of which is coupled to a power source (VDD); and a first amplifier (A1) coupled between the cathode of the photodiode (PD1) and a gate electrode of the first transistor (T1). B16. The image sensor according to B15, wherein the global speed threshold control unit is coupled to the pixel collection circuit via a first clock control signal line and a second clock control signal line, and the first clock control signal has a phase reverse to the second clock control signal. B18. The image sensor according to any one of B15 to B17, wherein the reading unit includes: a row selection module configured to respond to a row request signal from the pixel collection circuit array, and output row address information about a row which has responded to the row request signal; a column selection module configured to respond to a column request signal from the pixel collection circuit array, and output column address information about a column which has responded to the column request signal; and a reading control module configured to control the output of the row address information and the column address information.

In addition, it should be appreciated that, although some embodiments include some features in the other embodiments, the combination of the features in different embodiments may also fall within the scope of the present disclosure. For example, the features in the appended claims may be combined in any form.

In addition, some of the embodiments have been described as a combination of methods or method elements capable of being implemented by a processor of a computer system or any other device. Hence, the processor including necessary instructions for implementing the methods or the method elements may be used to form a device for implementing the methods or the method elements. In addition, the device is used to achieve functions of the elements.

Unless otherwise defined, such ordinal numerals as "first", "second" and "third" are merely used to differentiate different components rather than to represent any order, number or importance.

Although with the above embodiments, a person skilled in the art may obtain the other embodiments, which also fall within the scope of the present disclosure. In addition, it should be appreciated that, the words are selected in the present disclosure principally for readability and guidance, but shall not be construed as limiting the scope of the present disclosure. Obviously, a person skilled in the art may make further modifications and improvements without departing from the spirit of the present disclosure. The above description is for illustrative but not restrictive purposes, and the scope of the present disclosure shall be subject to the appended claims.

What is claimed is:

1. A pixel collection circuit, comprising:
   a photoelectric detection module configured to monitor an optical signal in real time and output a corresponding electric signal;
   a triggering generation module, a first input end of which is coupled to the photoelectric detection module, a first output end of which is coupled to an interface logic module, and which is configured to generate a triggering generation signal when a change frequency of the electric signal exceeds a predetermined frequency threshold and an amplitude of the electric signal meets a predetermined condition, and output the triggering generation signal to the interface logic module; and
   the interface logic module, a first input end of which is coupled to the triggering generation module, a second input end of which is coupled to a global resetting signal unit via a global resetting signal line, a first output end of which is coupled to the triggering generation module, and which is configured to output a triggering state signal upon the receipt of the triggering generation signal.

2. The pixel collection circuit according to claim 1, wherein the triggering generation module comprises:
   a pre-processing sub-module, an input end of which is coupled to an output end of the photoelectric detection module, and which is configured to pre-process the electric signal; and
   a threshold comparison sub-module, an input end of which is coupled to an output end of the pre-processing sub-module, and which is configured to receive a pre-processed electric signal from the pre-processing sub-module and generate the triggering generation signal when the amplitude of the electric signal meets the predetermined condition.

3. The pixel collection circuit according to claim 2, wherein the pre-processing sub-module comprises:
   a primary amplification sub-unit configured to preliminarily process the electric signal; and
   a speed threshold adjustment sub-unit coupled to a global speed threshold control unit via a first clock control signal line and a second clock control signal line, and configured to generate a predetermined frequency threshold in accordance with the received first clock control signal and second clock control signal, and determine whether the change frequency of the electric signal exceeds the predetermined frequency threshold.

4. The pixel collection circuit according to claim 3, wherein the primary amplification sub-unit comprises: a first capacitor, a first end of which is coupled to the output end of the photoelectric detection module; a second amplifier, an input negative pole of which is coupled to a second end of the first capacitor, and an input positive pole of which is configured to receive a fixed potential; and a second capacitor and a first switch connected in parallel to each other between the input negative pole and an output end of the second amplifier.

5. The pixel collection circuit according to claim 4, wherein the speed threshold adjustment sub-unit comprises: a second transistor, a source electrode is coupled to the input negative pole of the second amplifier, and a drain electrode of which is coupled to a source electrode of a third transistor; the third transistor, a drain electrode of which is coupled to the output end of the second amplifier; and a third capacitor, a first end of which is coupled to the drain electrode of the second transistor and the source electrode of the third transistor, and a second end of which is grounded, wherein a gate electrode of the second transistor is coupled to the global speed threshold control unit via the first clock control signal line, and a gate electrode of the third transistor is coupled to the global speed threshold control unit via the second clock control signal line.

6. The pixel collection circuit according to claim 4, wherein the speed threshold adjustment sub-unit comprises: a second transistor, a source electrode of which is coupled to the input negative pole of the second amplifier, and a drain electrode of which is coupled to a first end of a third capacitor; a third transistor, a source electrode of which is coupled to a second end of the third capacitor, and a drain electrode of which is coupled to the output end of the second amplifier; a fifth transistor, a source electrode of which is grounded, and a drain electrode of which is coupled to the first end of the third capacitor; a sixth transistor, a source electrode of which is grounded, and a drain electrode of which is coupled to the second end of the third capacitor; and the third capacitor connected between the drain electrode of the second transistor and the source electrode of the third transistor, wherein gate electrodes of the second transistor and the sixth transistor are coupled to the global speed threshold control unit via the first clock control signal line, and gate electrodes of the third transistor and the fifth transistor are coupled to the global speed threshold control unit via the second clock control signal line.

7. The pixel collection circuit according to claim 6, wherein the first switch of the pre-processing sub-module is implemented in the form of a single transistor.

8. The pixel collection circuit according to claim 7, wherein the first clock control signal has a phase reverse to the second clock control signal.

9. The pixel collection circuit according to claim 8, wherein a third input end and a fourth input end of the interface logic module are coupled to a reading unit via a row request line and a column request line, and a second output end and a third output end of the interface logic module are coupled to the reading unit via a row selection line and a column selection line.

10. The pixel collection circuit according to claim 9, wherein the interface logic module comprises: a latch configured to store and represent a current operating state of the pixel collection circuit, a first resetting signal of the latching being a global resetting signal generated by the global resetting control unit, a second resetting signal being an output signal from a handshake protocol control logic sub-module, and a setting signal being a triggering generation signal generated by the triggering generation module; and the handshake protocol control logic sub-module configured to process an interaction between the pixel collection circuit and the reading unit, and manage the triggering generation module.

11. The pixel collection circuit according to claim 9, wherein the handshake protocol control logic sub-module is further configured to output a control signal to the first switch of the pre-processing sub-module.

12. The pixel collection circuit according to claim 11, wherein the handshake protocol control logic sub-module is further configured to output the control signal to turn off the first switch when the pixel collection circuit enters a triggered state.

13. The pixel collection circuit according to claim 12, wherein the threshold comparison sub-module comprises: a first voltage comparator, a reverse-phase input end of which is configured to receive a fixed level representing a first threshold, and a same-phase input end of which is coupled to an output end of the pre-processing sub-module; a second voltage comparator, a same-phase input end of which is configured to receive a fixed level representing a second threshold, and a reverse-phase input end of which is coupled to the output end of the pre-processing sub-module; and an OR logic unit coupled to output ends of the first voltage comparator and the second voltage comparator, and configured to perform an OR logic operation on outputs of the first voltage comparator and the second voltage comparator.

14. The pixel collection circuit according to claim 13, wherein the photoelectric detection module comprises: a photodiode whose anode is grounded; a first transistor, a source electrode of which is coupled to a cathode of the photodiode and a drain electrode of which is coupled to a power source; and a first amplifier coupled between the cathode of the photodiode and a gate electrode of the first transistor.

15. An image sensor, comprising:
a pixel collection circuit array comprising a plurality of pixel collection circuits according to claim 14, and configured to monitor a change in a light intensity in a field of view and enter a triggered state when the change in the light intensity meets a predetermined condition;
a global resetting control unit configured to transmit a global resetting signal to each pixel collection circuit so as to initialize the pixel collection circuit array;
a global speed threshold control unit configured to transmit a first clock control signal and a second clock control signal to each pixel collection circuit; and
a reading unit configured to respond to each pixel collection circuit in the triggered state and output corresponding address information.

16. The image sensor according to claim 15, wherein the global speed threshold control unit is coupled to the pixel collection circuit via a first clock control signal line and a second clock control signal line, and the first clock control signal has a phase reverse to the second clock control signal.

17. The image sensor according to claim 16, wherein the global speed threshold control unit comprises: a frequency adjustment module configured to receive a reference clock signal at a fixed frequency and perform frequency division or frequency multiplication on the reference clock signal to generate a clock signal at a predetermined frequency; a phase adjustment module configured to receive the clock signal and generate two clock signals with reverse phases; and an amplitude adjustment module configured to adjust an amplitude of each of the two clock signals, and generate the first clock control signal and the second clock control signal.

18. The image sensor according to claim 17, wherein the reading unit comprises: a row selection module configured to respond to a row request signal from the pixel collection circuit array, and output row address information about a row which has responded to the row request signal; a column selection module configured to respond to a column request signal from the pixel collection circuit array, and output column address information about a column which has responded to the column request signal; and a reading control module configured to control the output of the row address information and the column address information.

* * * * *